(12) United States Patent
Engelhardt et al.

(10) Patent No.: US 6,433,814 B1
(45) Date of Patent: Aug. 13, 2002

(54) TV CAMERA

(75) Inventors: Johann Engelhardt, Bad Schonborn; Martin Hoppe, Waibstadt, both of (DE)

(73) Assignee: Leica Microsystems Heidelberg GmbH, Heidelberg (DE)

( * ) Notice: Subject to any disclaimer, the term of this patent is extended or adjusted under 35 U.S.C. 154(b) by 0 days.

(21) Appl. No.: 09/331,459

(22) PCT Filed: Dec. 20, 1997

(86) PCT No.: PCT/DE97/02996
§ 371 (c)(1),
(2), (4) Date: Sep. 3, 1999

(87) PCT Pub. No.: WO98/28905
PCT Pub. Date: Jul. 2, 1998

(30) Foreign Application Priority Data

Dec. 24, 1996 (DE) .......................................... 196 54 207

(51) Int. Cl.⁷ ................................................ H04N 7/18
(52) U.S. Cl. ............................. 348/79; 348/79; 348/80
(58) Field of Search ...................... 348/79, 80; 250/234

(56) References Cited

U.S. PATENT DOCUMENTS

| 4,844,617 A | 7/1989 | Kelderman et al. |
| 5,587,832 A | 12/1996 | Krause |

FOREIGN PATENT DOCUMENTS

| EP | 0 620 468 A1 | 10/1994 |
| EP | 0 666 487 A2 | 8/1995 |
| JP | 08237527 | 9/1996 |
| WO | WO 88/08550 | 11/1988 |
| WO | WO 93/07522 | 4/1993 |
| WO | WO 96/06369 | 2/1996 |

*Primary Examiner*—Andy Rao
(74) *Attorney, Agent, or Firm*—Simpson & Simpson, PLLC

(57) ABSTRACT

A TV camera for microscopic or macroscopic imaging is characterized by a confocal lens with a laser light source (1), a scanner (2), a detector (3) and an electronic control unit (4), for using confocal characteristics in the most compact possible format.

17 Claims, 3 Drawing Sheets

TV CAMERA

BACKGROUND OF THE INVENTION

The invention relates to a TV camera for microscopic or macroscopic images.

TV cameras in a great variety designs have been known in the art for many years. TV cameras are for example used on microscopes for transmitting images or recording them in mass storage.

In many applications, traditional light-optical microscopes are not adequate. Particularly in the case of inspection tasks in the biomedical sphere, and also in the industrial sphere, for example in the semi-conductor industry when confocal systems are needed because of the parameters there, but are far too bulky for rapid and simple use, and are much too expensive in relation to the "quick" applications needed there.

Thus for example the inspection of thick biological fluorescence preparations is not possible with a conventional lens and a conventional TV camera from outside because of irradiation, since the light coming from the focus of interest is irradiated. The use of conventional confocal systems required here is however too complex for the simple images and documentation required. Standard TV systems with deconvolution are likewise expensive, work slowly and are much too complicated to operate.

As regards the state of the art in respect of confocal systems or microscopes, we refer merely by way of example to WO 91/15792, U.S. Pat. No. 5,537,247 and U.S. Pat. No. 5,535,052.

SUMMARY OF THE INVENTION

The function of the present invention is to design and develop a TV camera for microscopic and macroscopic images in such a way that confocal characteristics can be used in an extremely compact format, and that no confocal systems that are sophisticated and complicated to use are required in the case of the simple applications in question here.

Ultimately a TV camera with confocal characteristics is to be made available to the microscope user so that it can be used to deal with simple tasks wherever existing confocal systems are too expensive to use and too complicated to operate. Such a TV camera is appropriate wherever quick and simple use is desirable, as in the case of biomedical inspection tasks or in the field of industry.

In the biomedical field, the user benefits from the confocal characteristic particularly from the fact that very good images are possible even with simpler preparations and thicker sections, especially images of the neighboring areas that are not disturbed by the preparation or the section.

The TV camera based on the object of the invention for microscopic or macroscopic images solves the task in hand through the features of patent claim 1, whereby the TV camera mentioned above is characterized by a confocal lens with a laser light source, a scanner, a detector and an electronic control unit.

In the device disclosed it has been recognized that the advantages known from confocal microscopy can be combined for simplicity of use in a TV camera, namely by reducing the confocal system to the functionality of a TV camera. The confocal TV camera accordingly includes a confocal lens with a single laser light source, a scanner, a detector and an electronic control unit, the camera being preferably characterized by a solid-state structure within the camera housing. This design is split into a few precision adjustment modules, namely modules relating to the stimulus or light source, the detector and the scanner. The various components can be glued into the camera housing.

It would also be particularly advantageous, especially having regard to the widest possible range of applications, for the lens as a whole to function polyfocally, whilst such functionality is not absolutely essential.

The laser light source includes at least one diode laser, the diode laser being a compact light source. Expensive coupling mechanisms are at all events not required in this case, because of the integral compact light source.

It is also advantageous if a diode laser combination is used as light source, namely both for monochrome and multi color fluorescence and for reflection. This also results in an overall compact light source, so that to this extent also no complex mechanisms are necessary to connect an external light source.

The individual diode lasers can be connected to an xy scanner by means of an adjusting connector with beam expander through a pinhole lens, a particularly important feature of which is that the laser light source as a whole is arranged to be adjustable. It is therefore not necessary to adjust the preceding pinhole or the detector or detector block discussed later.

Fixed filters can also be mounted after the laser light source, tuned to the laser, depending on the particular application. This also makes it simple to operate the camera.

In addition to the internal laser light source of the TV camera, the TV camera could further advantageously include an additional fibre input for connecting an external laser, preferably large, through fibre optic cables, especially for universal use; this external laser could advantageously be used for irradiation detection. Ultimately this measure creates mechanical decoupling of larger lasers, namely by fibre connection, so that an ArKr laser could for example link in via the fibre input, indirectly and mechanically decoupled.

An additional input could also be provided for directly connecting a further laser, for connecting an external laser that cannot be connected with fibers. This possibility is also provided by the second additional input that further increases the universal useability of the TV camera.

Insofar as the internal lasers have a laser power of more than 1 mW, special safety measures are advantageous and possibly necessary. In this regard the eyepiece is fitted with a cover to protect the operators. The laser also switches off automatically when the cover closes, further enhancing the level of safety.

The scanner used in the camera is designed on the lines of a point beam scanning mechanism, specifically an xy scanner, namely an xy PHI scanner.

It is particularly advantageous if the image can be rotated for purposes of adjusting or positioning the image, and especially for investigating or measuring the image in the case of structures in various orientations or viewed from various angles. A rotating camera adaptor can be provided on a mechanical basis for this purpose that serves for example for connecting to a microscope. To this extent the image can be mechanically turned or rotated, representing an extremely simple design.

It is also possible for a scanning lens and an optical arrangement for image rotation to be fitted after the scanner. It is also possible for. the scanner to include an integral arrangement for image rotation. This optical arrangement for image rotation may involve prisms of various forms. The arrangement for image rotation could also be in the form of a mirror arrangement, for example in the form of "K" mirrors.

The mirrors used as part of the mirror arrangement, and also the other mirrors used in the camera can have a planar mirror surface. But another option is for the mirrors to be in the form of a mirror surface in the form of a concave mirror, for example for imaging on a pinhole.

To make the camera universally useable, it is also advantageous if the scanning lens or the eyepiece can be exchanged for fitting to microscopes of different manufacturers. To that extent the camera can be connected to any microscope system from various manufacturers, ensuring a high degree of compatibility with microscopes of various manufacturers.

With respect to a specific practical detector design, it is advantageous if the detector is in the form of a multi color detector for reflection or fluorescence. The detector can also be in the form of a spectrometer or a multi band detector.

In one particularly advantageous configuration, the detector comprises a three color detector block with photo multipliers and color filters, which can involve a solid-state detector block. This detector block is permanently mounted in the camera housing.

A detection pinhole could on the other hand be permanently mounted in the detection beam path, with the detection beam being adjusted in a particularly advantageous manner by aligning the laser light source rather than by aligning the pinhole or the detector block. This ensures a cost effective and above all simple structure with stable adjustment inside the camera.

An electronic zoom is mounted in the detection beam path in a further advantageous manner. Providing such a zoom enables the desired image to be optimized, adjusted or enlarged.

In addition a pole filter could be provided in the detection beam path, preferably with color coded or intensity coded pole direction. This design feature also increases the universal applicability of the camera that is the subject of the present claim.

A lens with a focusing device for macroscopic imaging could be fitted after the scanner. This would enable the TV camera to be readily used in the macroscopic range as well, for example in quality control for semi-conductor technology, especially where simple and quick handling of such a camera is necessary in the macroscopic range.

In the context of a specific microscopic application, a microscope lens could be fitted immediately after the scanner, preferably mounted on the camera housing. This could provide a portable confocal microscope consisting of the TV camera and the microscope lens. This further enhances the universality of the TV camera.

With respect to the electronic control unit, it is also advantageous with regard to universal useability if this includes a microprocessor with an image buffer store and a standard TV output - BAS. The electronic control unit could moreover include a scan converter that converts the relatively slow polyfocal scan into standard TV signals, for example into BAS signals, FBAS signals, VGA signals, SVGA signals, etc. This measure serves to connect standard output devices and standard storage devices, with a special interface being provided for connecting such peripheral equipment. This can be a traditional computer interface.

Now an external monitor could be provided for the TV camera, connected to the TV camera via a special interface. But it would be possible in a particularly advantageous way to provide an integral display in the camera housing, preferably an LCD display. In this respect an external monitor would at all events not be necessary.

The display could again include a date and time overlay that could be stored together with the image data. A touch screen could also be provided for the display, making the camera particularly simple to use with the tough screen.

Particularly in the context of the simple operation that has already been frequently referred to, and that is desired especially in the case of simple applications, it is of further advantage if there are only a few controls. In this case there could be only three controls, namely controls for the functions "start/stop", "intensity" and "integration".

The "start/stop" function enables the TV camera to be switched on and off. The "intensity" function relates to activation of the laser light source. The "integration" function enables several images to be added together and thus amplified using a fluorescence process, especially with weak signals. This is particularly advantageous especially in the case of objects with low fluorescence. No more controls are at all events needed in the context of the simplest configuration of the TV camera that is the subject of this claim.

A digital mass storage could be mounted inside the camera housing for storing sequences of images in real time, either in the form of magnetic tape or an optical mass storage device. Finally traditional tapes can be used in the context of using a magnetic tape, and the tapes involved can with advantage be in a preferably digital video standard.

In addition it is advantageous if images process in any desired manner can be shown from the mass storage device on the display or on an external monitor.

Finally the independent use of the TV camera claimed is further facilitated by the internal or external energy supply being provided by batteries or rechargeable batteries, making its use universal.

BRIEF DESCRIPTION OF THE DRAWINGS

There are now various means of advantageously configuring and developing the theory of the present invention. This involves referring on the one hand to the subordinate claims to patent claim 1, and on the other hand to the subsequent explanations of three embodiments of the invention on the basis of the drawing. In general, preferred configurations and developments of the theory are also explained in connection with the explanation of the preferred embodiment of the invention.

The drawing shows

DETAILED DESCRIPTION OF THE PREFERRED EMBODIMENTS

Figure 1:
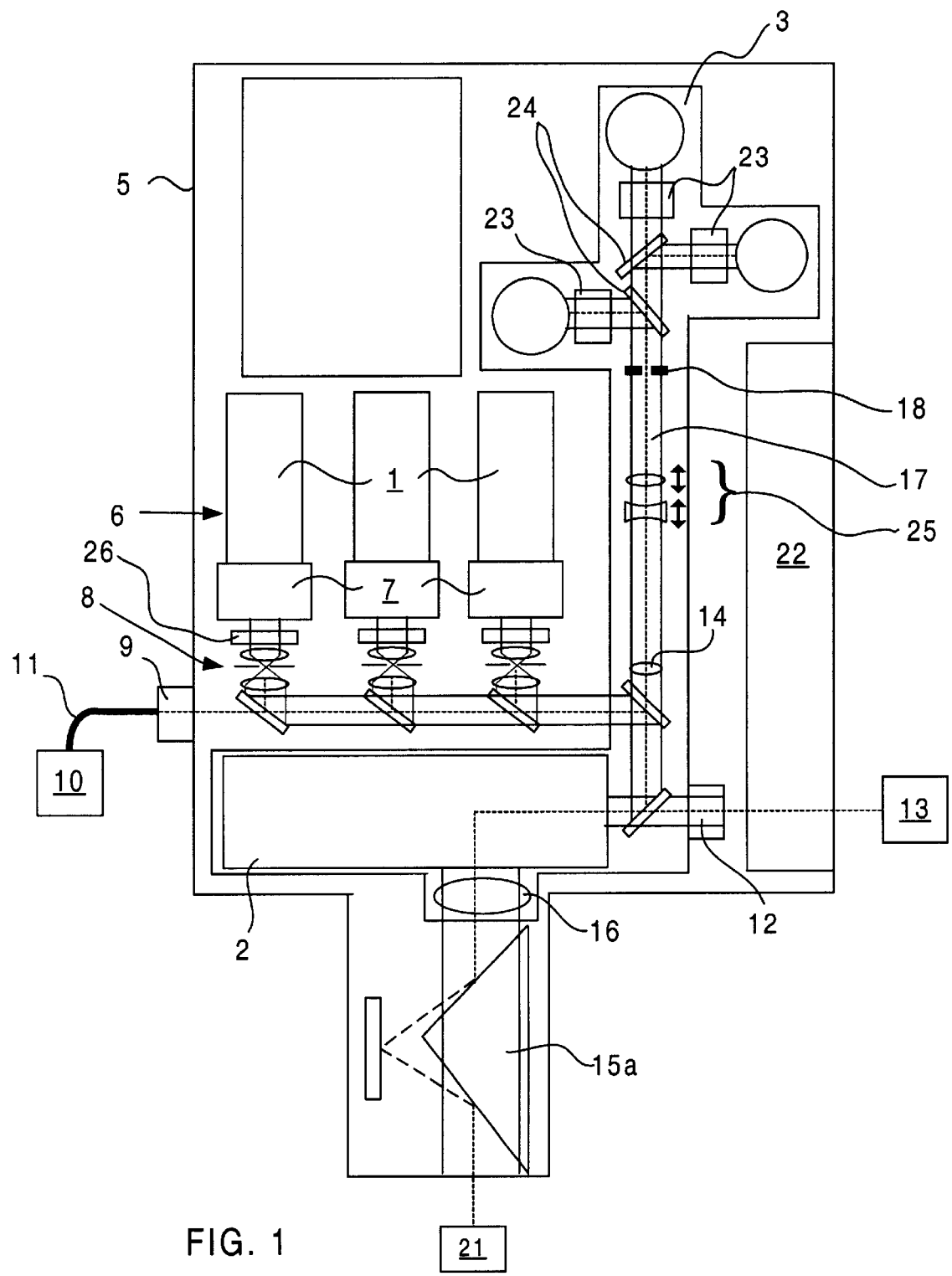
FIG. 1 a schematic side view of a first embodiment of a TV camera based on the object of the invention, showing only the main characteristics of the TV camera.
Figure 2:
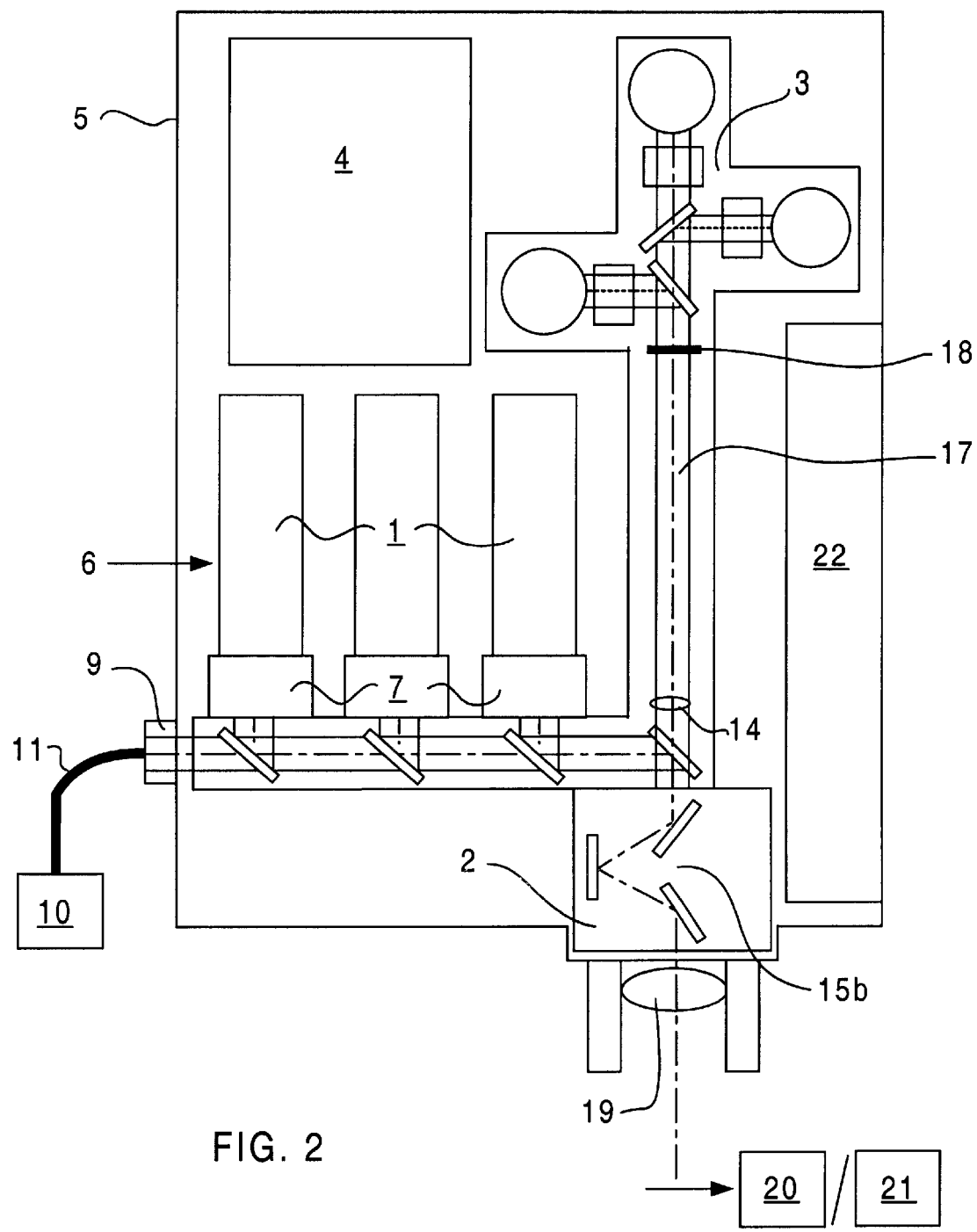
FIG. 2 a schematic side view of a second embodiment of a TV camera based on the object of the invention, and FIG. 3 a schematic side view of a third embodiment of the TV camera based on the object of the invention.
Figure 3:
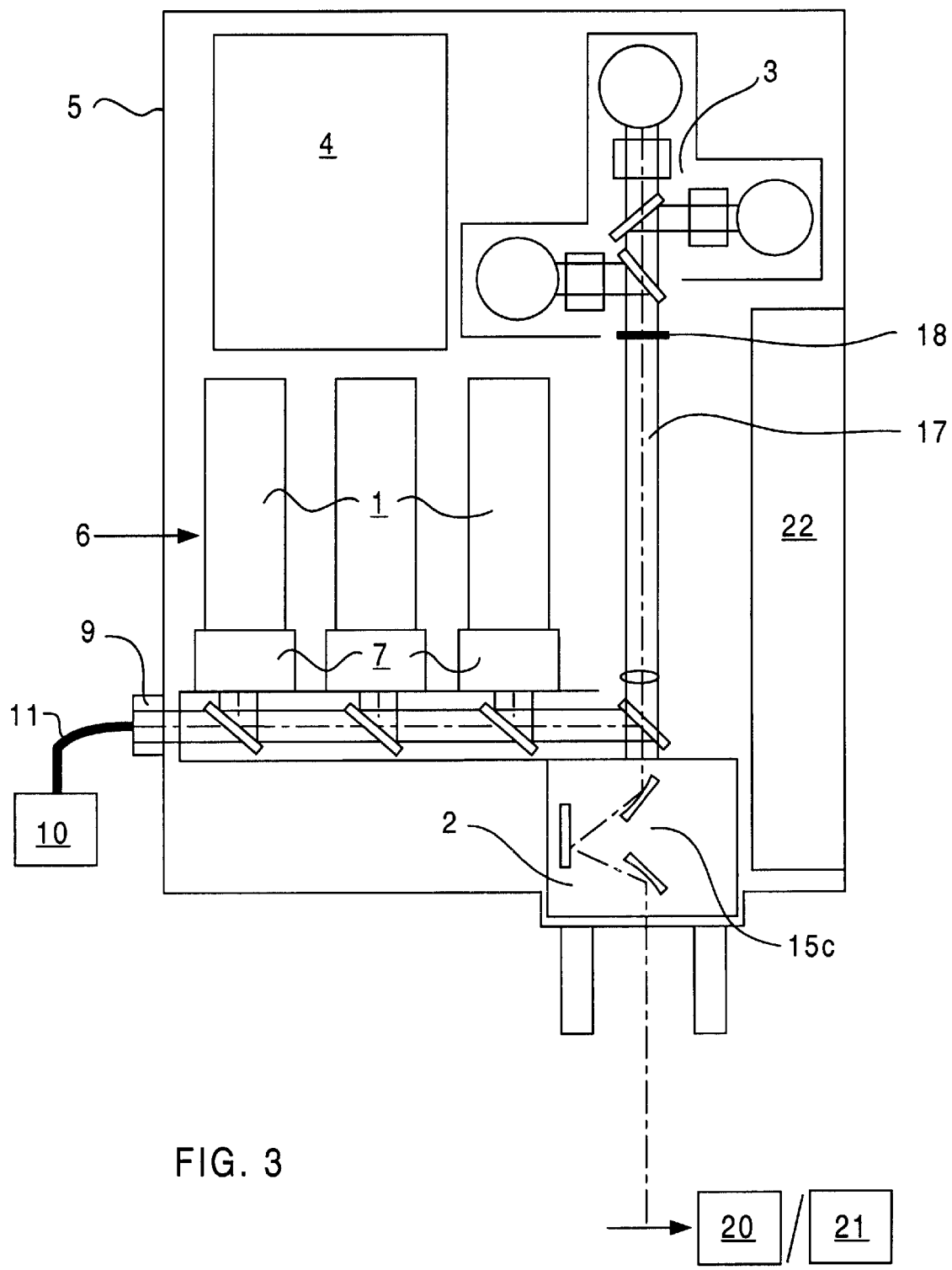

FIGS. 1 to 3 show three slightly varying embodiments of a TV camera based on the object of the invention, both for microscopic and for macroscopic images, with the TV camera including fundamentally a confocal lens with a laser light source 1, a scanner 2, a detector 3 and an electronic control unit 4.

The "insides" of the TV camera are characterized by a solid-state structure inside the camera housing 5, split into a few precision adjustment modules relating to the stimulus or light source 1, the detector 3 and the scanner 2.

The laser light source 1 includes in total a diode laser combination 6 for monochrome and multicolored fluorescence and reflection, with an adjusting coupler 7 with beam expander fitted after this diode laser combination. The laser light is linked into the xy scanner 2 through an optional pinhole lens 8. Depending upon the application, a plurality of fixed filters 26 can be mounted after respective laser diodes of laser light source 1 and tuned to the output of the associated laser diode.

FIGS. 1 to 3 show in addition that a further fiber input 9 is provided for connecting a (preferably large) external laser 10 via a fiber optic cable loom 11. In the case of the embodiment shown in FIG. 1, there is also an input 12 for directly connecting a further external laser 13 that cannot be connected with fibers.

FIG. 1 indicates that a scanning lens 6 and an optical arrangement 15 for image rotation is fitted after the scanner 2, the optical arrangement 15, called image rotator for short, being in the form of a "K" mirror with planar mirror surfaces.

In the embodiment shown in FIG. 2, an optical arrangement 15 for image rotation is incorporated or immediately allocated to the scanner 2. This is also a variant of a "K" mirror, that can be readily configured as a prism.

The Figures show in addition that the scanning lens 16 or the eye piece is/are exchangeable for adapting to microscopes from various manufacturers or for different applications (in microscopy or macroscopy). This is indicated in an overview of FIGS. 1 to 3.

The detector 3 is in the form of a multi color detector for reflection or fluorescence in all three embodiments in FIGS. 1 to 3. With respect to further configuration variants of detector 3, reference is made to the general part of the description in order to avoid repetition; this involves specifically a three color detector block with photo multipliers and color filters. The detector 3 preferably includes a color filter or polarization analyzer 23 before each photo multiplier. Alternatively, a pair of color or polarization beam splitters 24 can be positioned in the detection beam path before the photo multipliers to perform a similar function.

The Figures show in addition that a detection pinhole 18 is permanently installed in the detection beam path 17. There is no provision for adjusting the detector 3 or detection pinhole 18 because of the rigid installation. Adjustment is rather carried out by aligning the laser light source 1.

FIG. 2 indicates in addition that a lens 19 is fitted after the scanner 2, that can have a focusing device on the macroscopic device. In the context of such a configuration, the camera could be aligned directly on an object 20. The camera can also be used with a microscope 21, in which case the objective lens 19 functions as a scanning lens or scanning optical system.

The electronic control unit 4 includes a microprocessor not shown in the Figures with an image buffer store and a standard TV output. In this respect reference is likewise made to the general part of the description in order to avoid repetition.

Finally a display 22 is integrated in the camera housing 5, in this case an extremely compact LCD display.

Finally it should be noted in particular that the embodiments discussed above are for the purpose of clarifying the theory claimed, which is not however restricted to these embodiments.

Reference List

1 Laser light source
2 Scanner
3 Detector
4 Electronic control unit
5 Camera housing
6 Diode laser combination
7 Adjusting coupler
8 Pinhole optical system, optional beam adjustment and optional source pinhole
9 Fiber input
10 External laser (for the fiber input)
11 Fibre optic cable
12 Input (for direct coupling)
13 External laser (for input 12)
14 Pinhole lens
15 Optical arrangement for image rotation
16 Scanning lens
17 Detection beam path
18 Detection pinhole
19 Lens
20 Subject
21 Microscope
22 Display
23 Polarization or color filter
24 Polarization or color beam splitter
25 Zoom optical system
26 Filter

What is claimed is:

1. A TV camera for microscopic or macroscopic images of an object comprising a confocal lens including a laser light source, a scanner connected to said light source for scanning said object with a beam from said laser light source, a detector for receiving light reflected by said object and generating intensity signal information, and an electronic control unit for converting said signal information to produce a TV signal output.

2. The TV camera according to claim 1, wherein said laser light source, said scanner, said detector, and said electronic control unit are fixed within a camera housing, and said TV camera includes precision adjustment modules for said light source, said scanner, and said detector.

3. The TV camera according to claim 1, wherein said confocal lens functions polyfocally.

4. The TV camera according to claim 1, wherein said laser light source includes at least one laser diode.

5. The TV camera according to claim 1, wherein said laser light source includes a plurality of laser diodes combinable to produce monochrome and multi-colored fluorescence and reflection.

6. The TV camera according to claim 5, wherein each of said plurality of laser diodes has an adjustable coupler associated therewith for linking said laser diode to said scanner, and said adjustable coupler includes a beam expander.

7. The TV camera according to claim 5, wherein each of said plurality of laser diodes is followed by a fixed filter tuned to said laser diode.

8. The TV camera according to claim 1, further comprising a fiber optic input port for connecting an external laser light source to said TV camera via a fiber optic bundle.

9. The TV camera according to claim 1, further comprising a light input port for directly connecting an external laser light source to said TV camera.

10. The TV camera according to claim 1, wherein said detector is a multicolor detector.

11. The TV camera according to claim 1, wherein said detector is a spectrometer.

12. The TV camera according to claim 1, wherein said detector is a multiband detector.

13. The TV camera according to claim 1, wherein said detector includes three different color detection blocks each having a photo-multiplier and a color filter associated therewith.

14. The TV camera according to claim 1, wherein a pinhole occluder is fixed in a detection optical path between said object and said detector, and said laser light source is aligned relative to said pinhole occluder.

15. The TV camera according to claim 1, further comprising an electronic zoom system mounted in a detection optical path between said object and said detector.

16. The TV camera according to claim 1, further comprising polarization analyzer mounted in a detection optical path between said object and said detector.

17. The TV camera according to claim 1, wherein said electronic control unit includes a microprocessor connected to an image buffer memory and a standard TV signal output.

* * * * *